Feb. 24, 1959 R. LINDER ET AL 2,875,322
AUTOMATIC LAMP REGULATING MEANS
Filed Sept. 30, 1954 2 Sheets-Sheet 1
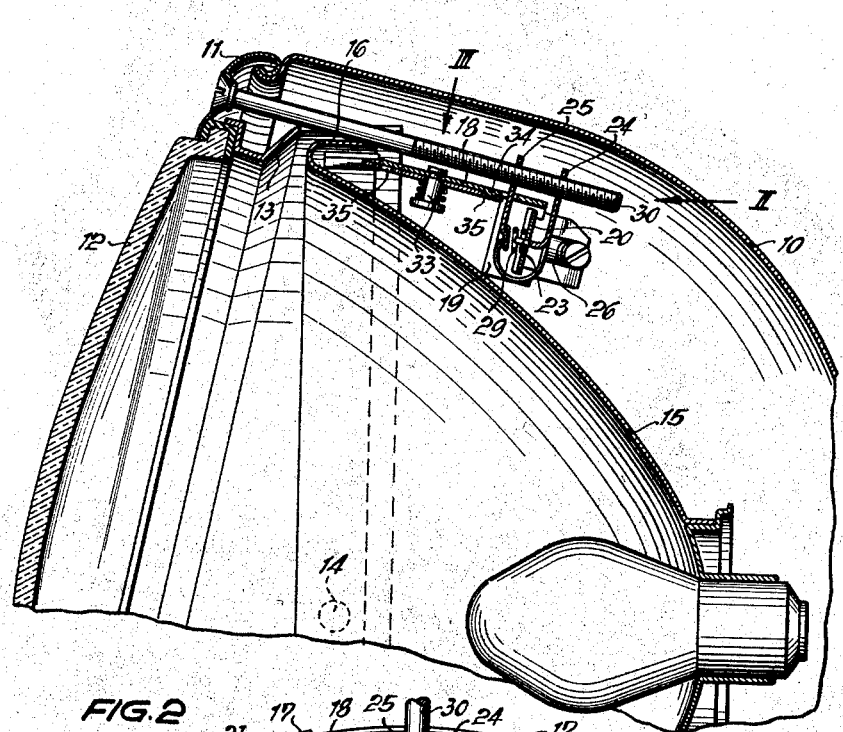
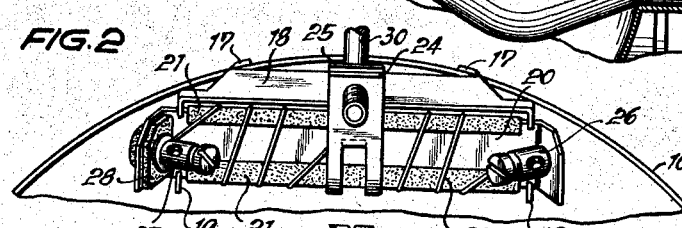
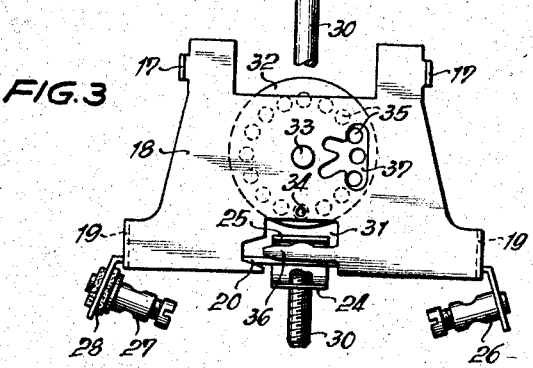
INVENTORS:
Rudolf Linder
Ernst Merkl
Johannes Rebentisch
By:
Michael S. Striker
agt.

Feb. 24, 1959 — R. LINDER ET AL — 2,875,322
AUTOMATIC LAMP REGULATING MEANS
Filed Sept. 30, 1954 — 2 Sheets-Sheet 2
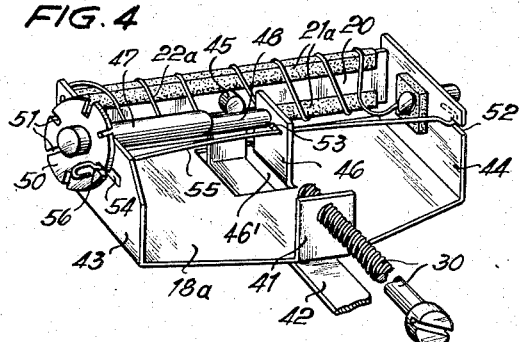
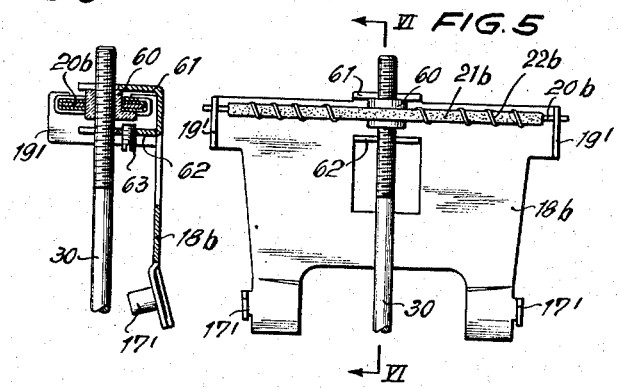
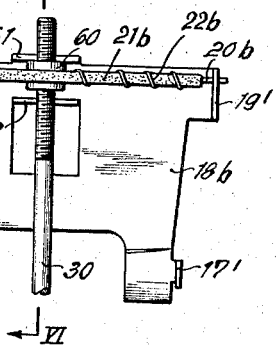
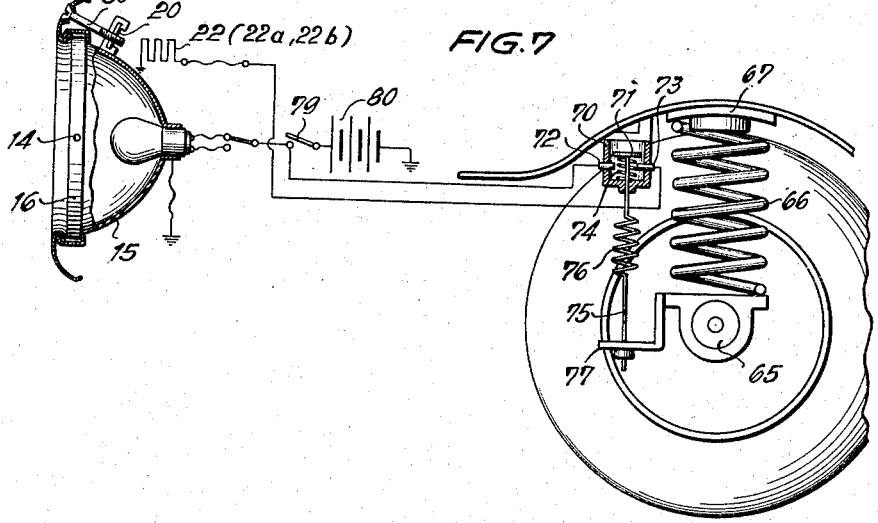
INVENTORS:
Rudolf Linder
Ernst Merkl
Johannes Rebentisch
By: Michael S. Striker agt.

United States Patent Office 2,875,322
Patented Feb. 24, 1959

2,875,322

AUTOMATIC LAMP REGULATING MEANS

Rudolf Linder, Stuttgart-Degerloch, Johannes Rebentisch, Stuttgart-Vaihingen, and Ernst Merkl, Stuttgart-Feuerbach, Germany, assignors to Robert Bosch G. m. b. H., Stuttgart, Germany Application September 30, 1954, Serial No. 459,228

Claims priority, application Germany October 1, 1953

14 Claims. (Cl. 240—7.1)

The present invention relates to lamps and more particularly to the lamps of vehicles such as automobiles.

With heavy duty vehicles such as trucks, for example, changes in the load carried by the vehicle vary the elevation especially of the rear of the vehicle on the wheels thereof so that the lamps of the vehicle change their inclination with respect to the road. For this reason, the efficiency of the light given by the lamps will vary with the load, and this effect is of course very undesirable.

One of the objects of the present invention is to provide a lamp with a means for automatically tilting the reflector thereof about a given axis so as to control the inclination of the light beam of the lamp. In this way, when the inclination of the reflector is controlled automatically by the load carried by the truck, the light beams of the truck lamps may be regulated so as to give a desired light irrespective of changes in the load.

Furthermore, it is an object of the present invention to provide an automatic regulating means of the above type which requires but little space and which may be accommodated between the reflector and lamp housing of a conventional lamp.

Also, it is an object of the present invention to provide an automatic regulating device which can be easily mounted on completed lamps of vehicles and the like.

An additional object of the present invention is to provide a regulating apparatus which may be easily adjusted to adapt the device for use with any type of vehicle.

With the above objects in view the present invention mainly consists of a device for automatically regulating the inclination of the light beam of a lamp, this device including a lamp housing and a reflector member mounted in the housing for turning movement about a given axis. A support member is carried by the housing, and an elongated bimetallic strip extends across a straight line normal to the turning axis of the reflector member. A carrier carries the strip and has a pair of connecting portions connected to the strip at a pair of spaced parts thereof and limiting the effective length of the strip to the distance between the pair of connecting portions of the carrier. Finally, a connecting means connects the bimetallic strip to the reflector member and the carrier to the support member or this means connects the bimetallic strip to the support member and the carrier to the reflector member, so that with either of these arrangements when the strip changes its curvature the reflector will be turned about its axis.

The novel features which are considered as characteristic for the invention are set forth in particular in the appended claims. The invention itself, however, both as to its construction and its method of operation, together with additional objects and advantage thereof, will be best understood from the following description of specific embodiments when read in connection with the accompanying drawings, in which:

Fig. 1 is a fragmentary, partly sectional, side elevational view showing the interior of a lamp with the device of the invention mounted therein and operatively connected thereto;

Fig. 2 is a fragmentary view of the device of the invention as seen in the direction of arrow II of Fig. 1;

Fig. 3 is a top view of the device of the invention as seen in the direction of arrow III of Fig. 1;

Fig. 4 is a fragmentary perspective view of a second embodiment of a device constructed in accordance with the present invention;

Fig. 5 is a plan view of a third embodiment of a device constructed in accordance with the present invention;

Fig. 6 is a side sectional view taken along the line VI—VI of Fig. 5 in the direction of the arrows; and Fig. 7 is a schematic illustration of the manner in which impulses are transmitted to the device of the invention upon changes in the load of a vehicle.

Referring now to the drawings, and in particular to Figs. 1–3, it will be seen that a ring 13 is fixed within the lamp housing 10 as by being joined to the periphery of the transparent glass cover 12 which is held on the housing 10 by the annular member 11, in a known way. The reflector 15 is pivotally carried by the ring 13 for turning movement about a horizontal axis, as viewed in Fig. 1, which is normal to the plane of Fig. 1 and which pass through a pair of pivot pins 14 one of which is shown in dotted lines in Fig. 1. Thus, for example, the reflector 15 is provided at opposite sides of its outer peripheral portion with the pair of pins 14 which extend through bores of the ring 13 so that in this way the reflector 15 is turnably carried by the ring 13 for movement about a horizontal axis.

The pins 14 are fixed to the outer surface of the rearwardly directed peripheral portion 16 of the reflector 15, and this peripheral portion 16 is formed with a pair of cutouts through which a pair of tongues 17 of a carrier 18 respectively extend, as shown in Fig. 2, these tongues 17 passing through the peripheral portion 16 of reflector 15 from the inner face of peripheral portion 16 to the outer face thereof, and the tongues 17 are bent over against the outer face of peripheral portion 16 so that in this way the carrier 18 is fixed to the peripheral portion 16, this carrier 18 extending rearwardly from the peripheral portion 16 of reflector 15, as shown in Fig. 1. The carrier 18 is in the form of a plate having at its rear end portion a pair of downwardly directed tongues 19, and these tongues 19 are formed with cutouts through which the bimetallic strip 20 extends. The tongues 19 thus form connecting portions of carrier 18 for connecting the strip 20 to the carrier 18, which thus carries the strip 20, and the effective length of the strip 20 is in this way limited to the distance between the portions 19 of carrier 18. If a straight line is drawn normal to the reflector turning axis formed by pins 14 and through the strip 20, it is evident from Fig. 1 that this strip 20 will extend across this straight line.

The opposite side edges of the strip 20 are covered with a pair of strips 21 of insulating material, and a heating wire 22 is wound around the strip 20 but contacts strips 21 and not the strip 20. The ends of the heating wire 22 are fixed in the clamps 26 and 27, respectively, which are of a known construction, the clamp 26 being directly fixed to the end portion of strip 20 which extends beyond the right portion 19 of carrier 18, as viewed in Fig. 2, while the other clamp 27 is fixed to the opposite end portion of strip 20 which extends beyond the left portion 19 of carrier 18, as viewed in Fig. 2, but this other clamp 27 is insulated from the strip 20 by the plate 28 on one side of strip 20 and a similar insulating plate on the other side of strip 20.

The strip 20 extends between the legs 24 and 25 of a U-shaped member which is connected to a screw member 30. The leg 24 of this U-shaped member is formed with a tongue 23 struck therefrom and extending toward the leg 25, as is evident from Fig. 1, and this tongue 23 terminates in a narrow projection extending through an opening in strip 20 so that the latter is guided by and abuts against the tongue 23. A spring 29 is partly guided by the narrow end portion of tongue 23 and presses against the left face of strip 20, as viewed in Fig. 1, to urge the strip 20 against the tongue 23, this spring 29 also abutting against the leg 25 of the U-shaped member so that in this way the strip 20 is connected to the U-shaped member. As is apparent from Fig. 2, the strip 20 is connected to the U-shaped member 24, 25 at a substantially central intermediate portion of strip 20 which is located between the parts of strip 20 connected to portions 19 of the carrier 18. The legs 24 and 25 are formed with coaxial threaded openings, respectively, through which the threaded portion of screw 30 threadedly extends, so that the U-shaped member 24, 25 is carried by the screw member 30 which is in turn turnably carried by the annular ring 11 on which the screw member 30 is in fact turnably mounted so that with a screwdriver or the like it is possible to turn screw member 30 to adjust the position of member 24, 25 therealong. As is evident from Fig. 1 the ring 13 is formed with a cutout through which the screw member 30 freely extends, and the peripheral portion 16 of reflector 15 is formed with a cutout also allowing the screw member 30 to pass freely by the outermost peripheral portion of reflector 15.

It is apparent that with the above-described structure the location of the central portion of strip 20 is fixed by the screw member 30 and the U-shaped member 24, 25 which is connected to this central portion of strip 20 by the tongue 23 and spring 29. Thus, when current flows through the wire 22 to heat the strip 20, this bimetallic strip 20 will change its curvature and since the central portion of the strip cannot move, the strip will move the carrier 18 which because of the connection of carrier 18 to reflector 15 will result in tilting of the latter about the horizontal axis passing through pivot pins 14.

In order to limit the extent to which the reflector 15 may be tilted by the structure of the inveniton, a stop means is provided, and this stop means cooperates with the leg 25 of the U-shaped member which extends through a cutout 31 of carrier 18, as is evident from Figs. 1 and 3. This stop means takes the form of a disc 32 which is eccentrically mounted for turning movement on the plate 18 by a pin 33 carried by plate 18 and extending through an off-center opening of disc 32. As is evident from Fig. 1, a spring located about pin 33 and engaging the enlarged bottom end thereof also engages the plate 32 to urge the latter against the underside of carrier 18. It is apparent that turning of the disc 32 on pin 33 will vary the distance between the periphery of disc 32 and leg 25. Thus, when the strip 20 curves so as to move plate 18 to the right, as viewed in Fig. 1, to tilt the reflector 15 in a clockwise direction as viewed in Fig. 1, the movement of plate 18 and turning of reflector 15 will be limited by the engagement between the periphery of disc 32 and leg 25. The disc 32 is formed with a series of openings 35 located along a circle whose center is in the axis of pivot pin 33, and the carrier 18 is provided with a downwardly extending projection 34 located along the circle of openings 35 so that the projection 34 extends into one of the openings 35 to releasably maintain the disc 32 in an adjusted position, the spring about pin 33 allowing the plate 32 to move away from and toward the carrier 18 as the projection 34 moves out of and into the openings 35, respectively. In order to allow the operator to easily adjust the disc 32 the carrier 18 is provided with a cutout 37 giving access to some of the openings 35, as shown in Fig. 3, so that the operator may place any suitable instrument such as a pencil or nail through one of the openings 35 to turn the disc 32.

As is apparent from Fig. 3, the cutout 31 of carrier 18 is limited on the side of leg 25 opposite from disc 32 by the portion 36 of plate 18 which has an edge directed toward leg 25 and serving as a second, non-adjustable stop. The leg 25 is shown in Fig. 3 in engagement with this non-adjustable stop, and with the parts in this position the plate 18 can move only to the right as viewed in Fig. 1. However, having once moved to the right, plate 18 can always move to the left until the portion 36 of plate 18 engages the leg 25. In this way movement of plate 18 and turning of reflector 15 is limited in both directions.

According to the embodiment of the invention shown in Fig. 4 the carrier 18a is provided with an upwardly directed portion 41 formed with a threaded opening in threaded engagement with screw 30 so that with this embodiment the screw 30 is directly connected to the carrier 18a. The bimetallic strip 20a, which is provided with insulating strips 21a and with a heating wire 22a, in the same way as the above-described embodiment, is carried at its opposite end portions by the upwardly directed side portions 43 and 44 of the carrier 18a, and an elongated member 42 extends at one end through an opening 46' of carrier 18a and is fixed to the central portion of the strip 20a. The end of the elongated member 42 distant from strip 20a is connected directly to the reflector, so that with the embodiment of Fig. 4 the carrier 18 and the end portions of strip 20a are maintained stationary with respect to the lamp housing, while the central portion of the strip 20a is connected to the reflector for tilting the latter in the manner described above, so that the embodiment of Fig. 4 is in principle the reverse of that of Figs. 1–3.

The strip 20a of Fig. 4 is provided with a projection 45 on the face of strip 20a visible in Fig. 4, and the parts 43 and 46 of the carrier 18a turnably support a shaft 47 having an eccentric portion 48 located opposite the projection 45 to cooperate therewith to form a stop limiting the extent to which strip 20a may change its curvature and thus limiting the tilting movement of the reflector. It is apparent that by turning the shaft 47 about its axis the eccentric portion 48 of this shaft will be located at different distances from the projection 45 so that in this way the extent of turning of the reflector may be adjusted. The portion 46 of the carrier 18a is struck from the material thereof to form the opening 46', and the edge of opening 46' located on the opposite side of strip 20a from the shaft 47 cooperates with the elongated member 42 to limit turning of the reflector in a direction opposite from that in which it turns when the projection 45 approaches the eccentric portion 48 of shaft 47.

In order to adjust the angular position of shaft 47, this shaft carries a disc 50 provided with a plurality of radially extending cutouts 51 extending through the disc 50 and into same from the outer periphery thereof. Thus, the operator need only turn the disc 50 to adjust the distance between eccentric portion 48 of shaft 47 and projection 45. In order to maintain the shaft 47 in its adjusted position, a wire 55 is provided, this wire having a right hooked end, as viewed in Fig. 4, located wtihin a cutout 52 of the portion 44 of carrier 18a. The wire 55 extends from cutout 52 through a cutout 53 in the tongue 46 and through a cutout 54 in the portion 43 of carrier 18a. It will be noted that the cutouts 53 and 54 are elongated so that the wire 55 may be shifted into and out of one of the cutouts 51 of the disc 50. This wire 55 is bent at 56 in such a way as to overlap the outer side face of disc 50 when the wire 55 is located in one of the cutouts 51, so that the wire 55 also serves to prevent axial shifting of shaft 47 and disc 50 which is fixed to the shaft 47.

A third and particularly simple embodiment of the invention is illustrated in Figs. 5 and 6. According to this embodiment of the invention the screw member 30 extends threadedly through an insulating member 60 which in turn extends through an opening in the strip 20b and is fixed to the strip 20b as by being pressed through the opening thereof so that in this way with the embodiment of Figs. 5 and 6 the central portion of strip 20b is fixed to the screw member 30. This strip 20b is a bimetallic strip corresponding to strips 20 and 20a, and the ends of strip 20b are connected to and carried by the portions 19' of the carrier 18b of Figs. 5 and 6, this carrier 18b having tongues 17' connected to the peripheral portion 16 of the reflector 15 in the same way as tongues 17 of the embodiment of Figs. 1–3. The bimetallic strip 20b is provided at its side edges with insulating strips 21b, and a heating wire 22b is wrapped around the strip 20 but contacts only strips 21b, the elements 21b and 22b corresponding to elements 21 and 22 of Figs. 1–3. As is apparent from Figs. 5 and 6, the carrier 18b is provided at one end with an upwardly directed portion 61 formed with a cutout through which the screw member freely extends, and the carrier 18b is further provided with a tongue 62 struck from the material of carrier 18b, located opposite tongue 61 on the opposite side of strip 20b from the tongue 61 and also formed with a cutout through which the screw member 30 freely extends. Thus, the tongues 61 and 62 are located on opposite sides of the strip 20b and cooperate with part 60 to form stops limiting movement of carrier 18b and reflector 15 in opposite directions, respectively. The tongue 61 forms a non-adjustable stop, while the tongue 62 threadedly carries a screw member 63 whose distance from member 60 may be regulated, as is clearly apparent from Fig. 6, so that in this way member 63 forms an adjustable stop limiting the movement of carrier 18b and the reflector in one direction.

It is believed to be apparent that the three embodiments of the invention described above are capable of accomplishing the same results. Fig. 7 of the drawings illustrates schematically the manner in which the structure of the invention cooperates with a vehicle to produce the desired results. Referring to Fig. 7 it will be seen that the wheel axle 65 is turnable in a bearing which supports a strong spring 66 on which a vehicle part 67 is mounted, so that as the vehicle moves along, the part 67 will move up and down with respect to shaft 65, the spring 66 resiliently supporting the vehicle at part 67 thereof. Furthermore, it is evident that the heavier the vehicle is loaded the more the spring 66 will be compressed and nearer the part 67 to shaft 65.

The part 67 of the vehicle carries a switch 70 which includes a pair of contact members 72 and 73 which are insulated from each other. The switch further includes a bridging contact member 71 which is urged upwardly, as viewed in Fig. 7, by the spring 74. A pull member 75 is connected to contact member 71 and to bracket 77 which is fixed to the bearing of shaft 65, and this pull member 75 is formed at an intermediate portion as a spring 76, the pull member 75 passing slidably through a bore in the bottom wall of the housing of switch 70. The relationship of springs 74 and 76 is such that when the vehicle carries a normal load the parts are in the position illustrated where the contact 71 is out of engagement with the contacts 72 and 73. However, it is apparent that during unloading of the vehicle or when the vehicle carries a relatively light load the spring 66 will expand to move the part 67 upwardly so that the contacts 72 and 73 move up into engagement with the contact 71 to close the switch 70. If under the latter conditions (where switch 70 is closed) the light switch 79 of the vehicle is also closed, then current flows from the battery 80 through the heating wire 22 (or 22a or 22b) to heat the bimetallic strip 20 (or 20a or 20b). The bimetallic strip thus changes its curvature to tilt the reflector 15 with respect to the lamp housing 10, 11. The screw member 30 is turned when the lamp is constructed or when the device of the invention is inserted into a lamp so as to adjust the reflector 15 for directing a beam toward the road in a desired manner for normal load conditions. With a lighter than normal load, it is evident that the bimetallic strip will become heated and curved to tilt the reflector 15 so that in spite of the light load and the difference in the compression of spring 66 and the elevation of the lamps from the road a light beam will still be directed toward the road in such a manner as to properly illuminate the road and at the same time not disturb operators of vehicles coming in the opposite direction, this operation taking place automatically with the arrangement of the invention.

The compensating action of the device of the invention is also guaranteed with a somewhat average load of such a size that when the vehicle is standing still the switch 70 is still open. In this latter event the up and down movements of the vehicle with respect to its wheels while the vehicle is travelling causes the switch 70 to become closed periodically, and under these circumstances when the light switch 79 is also closed the heating element will have current passing periodically therethrough to heat the same and to curve the bimetallic strip in such a way that this bimetallic strip is located between its end positions and tilts the reflector 15 to an inclination corresponding to that of the particular load.

The purpose of the screw 30, in addition to carrying part of the device, is to position the device in different types of lamps in proper relation to the reflector, and the adjustable stops of the different embodiments of the invention allow the device to be adapted for use with different types of vehicles. As a result of the great adaptability of the device of the invention to different types of lamps as well as its small space requirements, simple construction, and simple mounting, the device of the invention is not only suitable for use with lamps in an arrangement for varying the inclination of a reflector with a change in load, but in addition the structure of the invention can be used with a switch of any other kind, and may even be operated at will by a manually operable switch. Furthermore, inasmuch as it may be desired under certain circumstances to change the concentration of the beam with a change in the inclination of the beam, the device of the invention can, in addition to being connected to the reflector, be connected to a bulb carrier which is tiltably mounted so that the device of the invention operates on the bulb carrier as well as the reflector.

It will be understood that each of the elements described above, or two or more together, may also find a useful application in other types of lamp regulating means differing from the types described above.

While the invention has been illustrated and described as embodied in automatic lamp regulating means, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a device for automatically regulating the inclination of the light beam of a lamp, in combination, a lamp housing; a reflector member mounted in said housing for turning movement about a given axis; a support member carried by said housing; an elongated bimetallic strip extending across a straight line normal to said axis; a carrier carrying said strip and having a pair of connecting portions connected to said strip at a pair of spaced parts thereof and limiting the effective length of said strip to the distance between said pair of connecting portions of said carrier; and means connecting said strip to one of said members and said carrier to the other of said members, so that when said strip changes its curvature said reflector will be turned about its axis.

2. In a device for automatically regulating the inclination of the light beam of a lamp, in combination, a lamp housing; a reflector member mounted in said housing for turning movement about a given axis; a support member carried by said housing; an elongated bimetallic strip extending across a straight line normal to said axis; a carrier carrying said strip and having a pair of connecting portions connected to said strip at a pair of spaced parts thereof and limiting the effective length of said strip to the distance between said pair of connecting portions of said carrier; means connecting said strip to one of said members and said carrier to the other of said members, so that when said strip changes its curvature said reflector will be turned about its axis; and stop means carried by said carrier for limiting the extent to which said strip can change its curvature.

3. In a device for automatically regulating the inclination of the light beam of a lamp, in combination, a lamp housing; a reflector member mounted in said housing for turning movement about a given axis; a support member carried by said housing; an elongated bimetallic strip extending across a straight line normal to said axis; a carrier carrying said strip and having a pair of connecting portions connected to said strip at a pair of spaced parts thereof and limiting the effective length of said strip to the distance between said pair of connecting portions of said carrier; means connecting said strip to one of said members and said carrier to the other of said members, so that when said strip changes its curvature said reflector will be turned about its axis; and a pair of stops carried by said carrier adjacent opposite side faces of said strip to limit the extent to which the latter can change its curvature.

4. In a device for automatically regulating the inclination of the light beam of a lamp, in combination, a lamp housing; a reflector member mounted in said housing for turning movement about a given axis; a support member carried by said housing; an elongated bimetallic strip extending across a straight line normal to said axis; a carrier carrying said strip and having a pair of connecting portions connected to said strip at a pair of spaced parts thereof and limiting the effective length of said strip to the distance between said pair of connecting portions of said carrier; means connecting said strip to one of said members and said carrier to the other of said members, so that when said strip changes its curvature said reflector will be turned about its axis; a pair of stops carried by said carrier adjacent opposite side faces of said strip to limit the extent to which the latter can change its curvature; and adjusting means operatively connected to at least one of said stops for adjusting the distance between said one stop and said strip.

5. In a device for automatically regulating the inclination of the light beam of a lamp, in combination, a lamp housing; a reflector member mounted in said housing for turning movement about a given axis; a support member carried by said housing; an elongated bimetallic strip extending across a straight line normal to said axis; a carrier carrying said strip and having a pair of connecting portions connected to said strip at a pair of spaced parts thereof and limiting the effective length of said strip to the distance between said pair of connecting portions of said carrier; means connecting said strip to one of said members and said carrier to the other of said members, so that when said strip changes its curvature said reflector will be turned about its axis; and a pair of stops carried by said carrier adjacent opposite side faces of said strip to limit the extent to which the latter can change its curvature, one of said stops being in the form of a disc eccentrically carried by said carrier for turning movement and having a peripheral portion directed toward one of said side faces of said strip, so that the distance between said strip and disc may be adjusted by turning the latter on said carrier.

6. In a device for automatically regulating the inclination of the light beam of a lamp, in combination, a lamp housing; a reflector member mounted in said housing for turning movement about a given axis; a support member carried by said housing; an elongated bimetallic strip extending across a straight line normal to said axis; a carrier carrying said strip and having a pair of connecting portions connected to said strip at a pair of spaced parts thereof and limiting the effective length of said strip to the distance between said pair of connecting portions of said carrier; means connecting said strip to one of said members and said carrier to the other of said members, so that when said strip changes its curvature said reflector will be turned about its axis; and a pair of stops carried by said carrier adjacent opposite side faces of said strip to limit the extent to which the latter can change its curvature, one of said stops being in the form of a disc eccentrically carried by said carrier for turning movement and having a peripheral portion directed toward one of said side faces of said strip, so that the distance between said strip and disc may be adjusted by turning the latter on said carrier, said disc being formed with a series of apertures located along a circle whose center is in the turning axis of said disc, and said carrier having a projecting portion located along said circle to be selectively located in one of said apertures for releasably retaining said disc in an adjusted position on said carrier.

7. In a device for automatically regulating the inclination of the light beam of a lamp, in combination, a lamp housing; a reflector member mounted in said housing for turning movement about a given axis; a support member carried by said housing; an elongated bimetallic strip extending across a straight line normal to said axis; a carrier carrying said strip and having a pair of connecting portions connected to said strip at a pair of spaced parts thereof and limiting the effective length of said strip to the distance between said pair of connecting portions of said carrier; means connecting said strip to one of said members and said carrier to the other of said members, so that when said strip changes its curvature said reflector will be turned about its axis; and a pair of stops carried by said carrier adjacent opposite side faces of said strip to limit the extent to which the latter can change its curvature, one of said stops being an eccentric shaft portion parallel to said strip and turnably carried by said carrier.

8. In a device for automatically regulating the inclination of the light beam of a lamp, in combination, a lamp housing; a reflector member mounted in said housing for turning movement about a given axis; a support member carried by said housing; an elongated bimetallic strip extending across a straight line normal to said axis; a carrier carrying said strip and having a pair of connecting portions connected to said strip at a pair of spaced parts thereof and limiting the effective length of said strip to the distance between said pair of connecting portions of said carrier; means connecting said strip to one of said members and said carrier to the other of said members, so that when said strip changes its curvature said reflector will be turned about its axis; a pair of stops carried by said carrier adjacent opposite side faces of said strip to limit the extent to which the latter can change its curvature, one of said stops being an eccentric shaft portion parallel to said strip and turnably carried by said carrier; a disc fixed to one end of said shaft; and means carried by said carrier for holding said disc in an adjusted angular position so as to maintain said eccentric portion of said shaft at a desired distance from said strip.

9. In a device for automatically regulating the inclination of the light beam of a lamp, in combination, a lamp housing; a reflector member mounted in said housing for turning movement about a given axis; a support member carried by said housing; elongated bimetallic strip extending across a straight line normal to said axis; a carrier carrying said strip and having a pair of connecting portions connected to said strip at a pair of spaced parts thereof and limiting the effective length of said strip to the distance between said pair of connecting portions of said carrier; means connecting said strip to one of said members and said carrier to the other of said members, so that when said strip changes its curvature said reflector will be turned about its axis; a pair of stops carried by said carrier adjacent opposite side faces of said strip to limit the extent to which the latter can change its curvature, one of said stops being an eccentric shaft portion parallel to said strip and turnably carried by said carrier; a disc fixed to one end of said shaft and formed with a plurality of cutouts extending through said disc and radially into said disc from the outer periphery thereof; and a wire carried by said carrier for movement into one of said cutouts of said disc to prevent turning said disc and shaft, said wire having a bent portion overlapping a side face of said disc when said wire is in one of said cutouts thereof to prevent axial movement of said disc and shaft.

10. In a device for automatically regulating the inclination of the light beam of a lamp, in combination, a lamp housing; a reflector member mounted in said housing for turning movement about a given axis; a screw member turnably carried by said housing; an elongated bimetallic strip extending across a straight line normal to said axis; connecting means connecting said strip to a threaded portion of said screw member; and a carrier carrying said strip and having a pair of portions connected to said strip at a pair of spaced parts, between which said connecting means is located, and limiting the effective length of said strip to the distance between said portions of said carrier, said carrier being connected to said reflector member so that a change in the curvature of said strip is transmitted through said carrier to said reflector member to turn the latter about said axis.

11. In a device for automatically regulating the inclination of the light beam of a lamp, in combination, a lamp housing; a reflector member mounted in said housing for turning movement about a given axis; a screw member turnably carried by said housing; an elongated bimetallic strip extending across a straight line normal to said axis; a U-shaped member having a pair of legs respectively formed with a pair of threaded bores through which a threaded portion of said screw member extends and providing a threaded connection between said U-shaped member and screw member, said strip extending between the legs of said U-shaped member and one of said legs having a tongue struck therefrom and engaging one side face of said strip; a spring engaging the opposite side face of said strip and the other of the legs of said U-shaped member to resiliently clamp said strip between said spring and tongue; and a carrier carrying said strip and having a pair of portions connected to said strip at a pair of spaced parts, between which said U-shaped member is located, and limiting the effective length of said strip to the distance between said portions of said carrier, said carrier being connected to said reflector member so that a change in the curvature of said strip is transmitted through said carrier to said reflector member to turn the latter about said axis.

12. In a device for automatically regulating the inclination of the light beam of a lamp, in combination, a lamp housing; a reflector member mounted in said housing for turning movement about a given axis; a screw member turnably carried by said housing; an elongated bimetallic strip extending across a straight line normal to said axis; a U-shaped member having a pair of legs respectively formed with a pair of threaded bores through which a threaded portion of said screw member extends and providing a threaded connection between said U-shaped member and screw member, said strip extending between the legs of said U-shaped member and one of said legs having a tongue struck therefrom and engaging one side face of said strip; a spring engaging the opposite side face of said strip and the other of the legs of said U-shaped member to resiliently clamp said strip between said spring and tongue; and a carrier carrying said strip and having a pair of portions connected to said strip at a pair of spaced parts, between which said U-shaped member is located, and limiting the effective length of said strip to the distance between said portions of said carrier, said carrier being connected to said reflector member so that a change in the curvature of said strip is transmitted through said carrier to said reflector member to turn the latter about said axis, said carrier being formed with a cutout through which a leg of said U-shaped member extends and an edge portion of said cutout being located adjacent said latter leg to form a stop limiting the movement of said reflector member.

13. In a device for automatically regulating the inclination of the light beam of a lamp, in combination, a lamp housing member; a reflector member mounted in said housing member for turning movement about a given axis; an elongated bimetallic strip extending across a straight line normal to said axis; first connecting means connecting an intermediate portion of said strip to one of said members; and second connecting means connecting portions of said strip respectively located on opposite sides of said intermediate portion thereof to the other of said members so that when the curvature of said strip changes said reflector member will be turned about said axis.

14. In a device for automatically regulating the inclination of the light beam of a lamp, in combination, a lamp housing member; a reflector member mounted in said housing member for turning movement about a given axis; an elongated bimetallic strip extending across a straight line normal to said axis; first connecting means connecting an intermediate portion of said strip to said housing member; and second connecting means connecting portions of said strip respectively located on opposite sides of said intermediate portion thereof to said reflector member so that when the curvature of said strip changes said reflector member will be turned about said axis.

References Cited in the file of this patent

UNITED STATES PATENTS

| 1,861,752 | Patterson | June 7, 1932 |
| 2,105,866 | Sheaffer | Jan. 18, 1938 |
| 2,556,870 | Clark | June 12, 1951 |

FOREIGN PATENTS

| 728,561 | France | Apr. 12, 1932 |
| 816,558 | France | May 3, 1937 |
| 177,677 | Austria | Feb. 25, 1954 |